(12) United States Patent
Onuki et al.

(10) Patent No.: US 7,951,483 B2
(45) Date of Patent: May 31, 2011

(54) ASSEMBLED BATTERY WITH INNER AND OUTER FRAMES

(75) Inventors: Toshiaki Onuki, Saitama (JP);
Takeyuki Goto, Ibaraki (JP); Koutarou Ikeda, Ibaraki (JP); Tunemi Aiba, Gunma (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 1170 days.

(21) Appl. No.: 11/609,832

(22) Filed: Dec. 12, 2006

(65) Prior Publication Data
US 2007/0132429 A1 Jun. 14, 2007

(30) Foreign Application Priority Data
Dec. 14, 2005 (JP) ................................. 2005-360310

(51) Int. Cl.
*H01M 2/00* (2006.01)
*H01M 6/42* (2006.01)
*H01M 2/02* (2006.01)
*H01M 6/44* (2006.01)

(52) U.S. Cl. ........ 429/163; 429/148; 429/149; 429/151; 429/152; 429/164; 429/178; 429/179; 320/116

(58) Field of Classification Search .................. None
See application file for complete search history.

(56) References Cited

U.S. PATENT DOCUMENTS
6,410,184 B1 * 6/2002 Horiuchi et al. .............. 429/156
6,444,904 B1 * 9/2002 Holman et al. ............... 174/520
2002/0034898 A1 * 3/2002 Kuwayama et al. .......... 439/877

FOREIGN PATENT DOCUMENTS
JP 2000-182583 A 6/2000
JP 2002-373710 A 12/2002
* cited by examiner

*Primary Examiner* — Dah-Wei D Yuan
*Assistant Examiner* — Kwang Han
(74) *Attorney, Agent, or Firm* — Roberts Mlotkowski Safran & Cole P.C.

(57) ABSTRACT

The present invention provides an assembled battery with reduced weight and high reliability that can achieve improvement of assembling easiness at low cost. An assembled battery is provided with a frame holding a plurality of unit cells 14 having positive polarity at one end and negative polarity at the other end. The frame is composed of two outer frames 2 having the same shape and an inner frame 3. The unit cells 14 constituting an assembled battery 1 are disposed on both sides of the inner frame 3, and one outer frame 2 and the other outer frame 2 are disposed such that the unit cells are sandwiched between the former outer frame 2 and the inner frame 3 and between the latter outer frame 2 and the inner frame 3. The two outer frames 2 are joined to the inner frame 3 through side face coupling portions 23 and vertical coupling portions 24. The inner frame 3 is fixed with positive electrode bus bars 5, negative electrode bus bars 6, and inter-unit cell bus bars 7 for electrically connecting the unit cells 14 in series, and lead wires for voltage detection with a connector 4 for detecting voltages of the unit cells 14.

18 Claims, 5 Drawing Sheets

ASSEMBLED BATTERY WITH INNER AND OUTER FRAMES

FIELD OF THE INVENTION

The present invention relates to an assembled battery, and in particular to an assembled battery provided with a frame holding a plurality of unit cells, each unit cell having a positive electrode at one end and a negative electrode at the other end.

DESCRIPTION OF THE RELATED ART

Conventionally, in an assembled battery (a collected cells), high voltage or large capacity is achieved by electrically connecting a plurality of secondary batteries (unit cells) in series or in parallel. In order to assemble a plurality of unit cells, a method for welding terminals of unit cells to bus bars made of a conductive member to connect unit cells in series and/or in parallel or a method for providing preliminarily worked screw portions on positive electrode terminals and negative electrode terminals of unit cells or joining conductive members having worked screw portions to positive and negative electrode terminals and then fastening and fixing bus bars to the screw portions to connect the unit cells in series or in parallel has been proposed.

When a whole container of a unit cell constituting an assembled battery has one polarity, generally, in such a case that a metal battery can having a bottom is used for the container, a surface (a side peripheral face) of the container of the unit cell is covered with thermally-shrinkable tube, an insulating film, or the like in order to prevent short-circuiting and ensure safety during assembling of unit cells or the like. Each unit cell is retained in an insulating frame to be fixed so as not to float.

An assembled battery where operation for the cover is performed after or before connection of the conductive member and a connected (joined) portion of the cover and the conductive member is protected from external force due to vibration or the like by holding each unit cell by the frame has been disclosed (e.g., JP-A-2000-182583). The present inventors previously proposed an assembled battery where four cylindrical unit cells are arranged in two holders formed in a recessed circular shape in two rows and in two columns to be connected in series (e.g., JP-A-2002-373710).

For example, when a power source with high power is required in such a case that it is utilized as a power source for a mobile machine such as a power source for an automobile, the total number of unit cells to be used reaches several tens. A work for serially connecting the several tens unit cells through the above-described conductive members requires a large number of steps, which results in high cost power source from a viewpoint of prevention of short-circuiting. In order to reduce the number of conductive members, it is desirable to connect conductive members connecting unit cells, for example, bus bars through direct welding, plastic deformation, or the like. However, when any defect occurs in one of the connected unit cells, all the several tens unit cells connected are wholly handled as a defective product. To contrast, when fastening of the above-described screw connection type is adopted, electrical connection can be performed plural times, so that it is possible to replace only a defective unit cell with a normal unit cell. However, since the number of parts to be fastened increases in this connection state, such a problem as increase in part cost, increase in assembling and working cost, or increase in weight arises.

When the unit cell is a lithium ion cell, a lead line for detecting a voltage of each unit cell to monitor the same must be connected to the unit cell and work for the connection is much cumbersome. When the unit cell is a power source for a mobile machine, a connection portion of the unit cell with a conductive member, a connection portion thereof with a voltage detecting member, a fixing portion of each unit cell itself, a fixing portion of a collected cell battery composed of plural unit cells themselves, a fixing portion of each conductive member or each voltage detecting member itself, and the like must have shock-proof property, and the shock-proof property must always secure individual shapes of respective parts in environment where the assembled battery is used. Especially, environment of using a power source for a mobile machine largely varies depending on a region where the power source is used, a season where it is used, and the like. Therefore, an assembled battery that is an assembly of various parts including cell containers constituting an outer casing of a unit cells, conductive members, an insulating frame for holding and fixing these members or parts must be considered regarding not only an external force such as vibration but also thermal stresses caused by differences in thermal expansion among the respective parts or members. On the other hand, in the assembled battery composed of many unit cells, cooling air must be caused to pass through respective spaces formed among the respective unit cells in order to suppress heat generations of the unit cells at charging and discharging times to make performances of the unit cells even.

Further, variations in size occur among parts produced industrially themselves. Therefore, a space occurring between parts is largely influenced by vibrations, which may cause such a problem as stoppage of power supplying due to breaking at a connection portion or an insulated portion, or heat generation or firing due to short-circuiting. The frame for holding and fixing several tens unit cells collectively has a complicated shape, causes increase in cost, and requires complicated assembling work thereof, so that cost required for the work increases. Further, in a recycling work for the assembled battery obtained by collectively fixing respective unit cells, such a problem occurs that a disassembling work becomes more complicated than the assembling work.

SUMMARY OF THE INVENTION

In view of the above-described circumstances, an object of the present invention is to provide an assembled battery with high reliability and light weight that can achieve improvement of assembling easiness at low cost.

In order to solve the above problem, there is provided an assembled battery provided with a frame for holding a plurality of unit cells, each unit cell having a positive electrode at one end thereof and having a negative electrode at the other end, wherein the frame has a first outer frame, an inner frame, and a second outer frame, the plurality of unit cells are disposed on both sides of the inner frame, the first outer frame and the second outer frame are respectively disposed on one side and the other side of the inner frame to be joined to the inner frame such that the unit cells are sandwiched between the first outer frame and the inner frame and between the second outer frame and the inner frame, and the inner frame is fixed with terminal bus bars and inter-unit cell bus bars for electrically connecting the unit cells and with lead wires for voltage detection for detecting voltages of the respective unit cells.

In the present invention, since a plurality of unit cells are disposed based upon the first or second outer frame, the unit cells are disposed on both outer sides of the inner frame by sandwiching one or some of the unit cells between the inner frame and the first or second outer frame and sandwiching the remaining unit cell or unit cells between the inner frame and the second or first outer frame, and the plurality of unit cells constituting the assembled battery are held in the frames by joining the first and second outer frames to the inner frame, assembling work for the assembled battery is made simple. Further, since unit cells are held by the frames, it is made possible to form a space that allows passage of cooling air among the unit cells during assembling for the assembled battery, and since the terminal bus bars, the inter-unit cell bus bars, and the lead wires for voltage detection can be fixed to the inner frame in advance, an assembling rate is remarkably improved and connecting work for respective parts are made easy.

In the present invention, when the first outer frame and the second outer frame have the same shape, the number of kinds of parts constituting the assembled battery can be reduced, so that easiness of parts management can be achieved. When each of the first and second outer frames and the inner frame has two retaining portions abutting on positive and negative electrode end portions of the unit cells and a supporting portion defining a distance between the two retaining portions, the retaining portions are positioned at both end portions of the unit cells so that a major part of side faces of the unit cells is exposed. Therefore, an area of the unit cells contacting with cooling air can be taken largely, and accordingly, cooling performance for the unit cells can be improved. Further, since the distance between the two retaining portions is defined by the supporting portion, an outside dimension of the assembled battery can be fixed so that fluctuation in dimension due to an assembling work can be reduced.

When such a constitution is adopted that the retaining portions of the first outer frame and the second outer frame are respectively formed with a first fitting hole and a first protrusion, and the retaining portions of the inner frame are each formed with a second protrusion fitted into the first fitting hole and a second fitting hole fitted with the first protrusion, so that the first outer frame and the second outer frame are joined to the inner frame by fitting the first and second protrusions into the second and first fitting holes, respectively, joining of these frames can be rapidly achieved without using a working jig such as a holding jig, and accordingly, assembly operation is improved. At this time, when a direction in which the first protrusion is fitted into the second fitting hole and a direction in which the second protrusion is fitted into the first fitting hole are orthogonal to each other, fitting strength can be improved.

When such a constitution is employed that the lead wires for voltage detection are disposed along the supporting portion of the inner frame and are fixed thereto, flip-flopping of the lead wires for voltage detection due to vibrations or cooling air or breaking of the lead wires due to flip-flopping thereof can be prevented. When such a constitution is employed that the terminal bus bars and the inter-unit cell bus bars are fixed to the retaining portions of the inner frame, conductive members for connection can be collectively disposed at the inner frame, so that reduction of costs for parts constituting the whole frames and size-reduction of the assembled battery can be achieved, and contacting arrangement or proximity arrangement of the terminal bus bars and the inter-unit cell bus bars to the positive and negative electrode terminals can be achieved. When such a constitution is employed that the lead wires for voltage detection are connected to the terminal bus bars and the inter-unit cell bus bars fixed to the retaining portions of the inner frame, connecting work during assembling can be largely reduced and short-circuiting during the work can be prevented. When such a constitution is employed that crimp-type terminals each having a distal end of a rod shape or a cylindrical shape are connected to the lead wires for voltage detection, and fitting portions holding the crimp-type terminals are formed on the terminal bus bars and the inter-unit cell bus bars, and, the lead wires for voltage detection and the terminal bus bars as well as the inter-cell unit bus bars are connected by plastically deforming the crimp-type terminals and the fitting portions, connecting work can be achieved rapidly between the lead wires for voltage detection and the terminal bus bars as well as the inter-cell unit bus bars.

When such a constitution is employed that the retaining portions have positioning portions for defining face positions of ends of the positive and negative electrodes of the unit cells, positioning work for the unit cells can be eliminated so that the assembling work is remarkably facilitated. Moreover, since face positions of the positive and negative electrode ends of the plurality of the unit cells held by the frames become flush with one another, variations in joining work of the positive and negative electrode ends of the unit cells and of the terminal bus bars and the inter-cell unit bus bars can be suppressed to the minimum. When such a constitution is employed that the unit cells are cylindrical and the retaining portions have arc-shaped abutting portions abutting on end portion peripheral faces of the unit cells, since the end portion peripheral faces of the unit cells abut on the abutting portions of the retaining portions at both sides, floating movement of the unit cells within the frames can be prevented. At this time, when such a constitution is employed that the abutting portions are formed with a groove portion for being filled with bonding material, even if a space due to manufacturing variations occurs between the abutting portions and the end portion peripheral faces of the unit cells, bonding material is filled in the space by filing the bonding material in the groove portions so that the unit cells are held and fixed to the frames. Thereby, a vibration-proof assembled battery can be obtained and thermal stress can be relaxed owing to elastic force of the bonding material. When such a constitution is employed that the groove portion formed at the abutting portions has a first groove portion formed to extend along the arc shape of the abutting portions and a second groove portion formed to extend in a direction perpendicular to the first groove portion, since an excessive part of bonding material filled in the first groove portion formed to extend along the arc-shape of the abutting portions moves to the second groove portion formed to extend in a direction perpendicular to the first groove portion, a bonding area can be secured largely by moved excessive bonding material without the assembling work being blocked by the excessive bonding material. Further, since the first outer frame and the second outer frame are fixed to the inner frame, working costs can be reduced without requiring a working jig even if time is needed until bonding force due to the bonding material appears.

When such a constitution is employed that a side face of each of the unit cells except for the one end and the other end thereof is coated with an insulating coating material, the terminal bus bars and the inter-unit cell bus bars are fixed to the retaining portions of the inner frame and are joined to either one of the positive electrode and the negative electrode of each of the unit cells, and the retaining portions have abutting portions abutting on end portion peripheral faces of the unit cells, the unit cells and the frames can be disassembled by only cutting the terminal bus bars and the inter-unit cell bus bars or breaking the joined portions between the bus bars and the unit cells, cutting and breaking the coating material, and cutting the supporting portions of the frames.

When such a constitution is employed that each of the terminal bus bars fixed to the inner frame has a male screw portion or a female screw portion, electrical connection of a plurality of the assembled batteries can be performed by only screw-fastening inter-assembled battery bus bars for electrically connecting the assembled battery to the male screw or the female screw, and required power can be obtained by simply increasing or decreasing the number of assembled batteries to be connected. When such a constitution is employed that a hole or a notched groove for positioning or fixing is formed in the first and second outer frames, positioning of the assembled batteries can be performed by only fitting the holes or the notched grooves to protrusions provided on a platform for fixing the assembled batteries so that working efficiency is improved. Since vibration-proof performance is imparted to the assembled battery or collected assembled battery obtained by arranging a plurality of the assembled batteries, performance suitable for a power source for a mobile machine can be developed. Further, even if any defect occurs in one unit cell in the collected assembled battery, only an assembled battery to which the defective unit cell belongs can be replaced by a new assembled battery, so that a degree of damage can be reduced from the whole collected assembled battery to an individual assembled battery. When such a constitution is employed that each of the lead wires for voltage detection is fixed with a connector at one side thereof, each of the lead wires for voltage detection connected to each unit cell are collected by the connector, so that wire connection in the collected assembled battery is facilitated and short-circuit due to erroneous wiring or the like can be prevented from occurring.

DETAILED DESCRIPTION OF THE PREFERRED EMBODIMENTS

With reference to the drawings, an embodiment that the present invention is applied to a battery module (collected assembled battery) for an electric vehicle will be explained below.

(Constitution)

Figure 1:
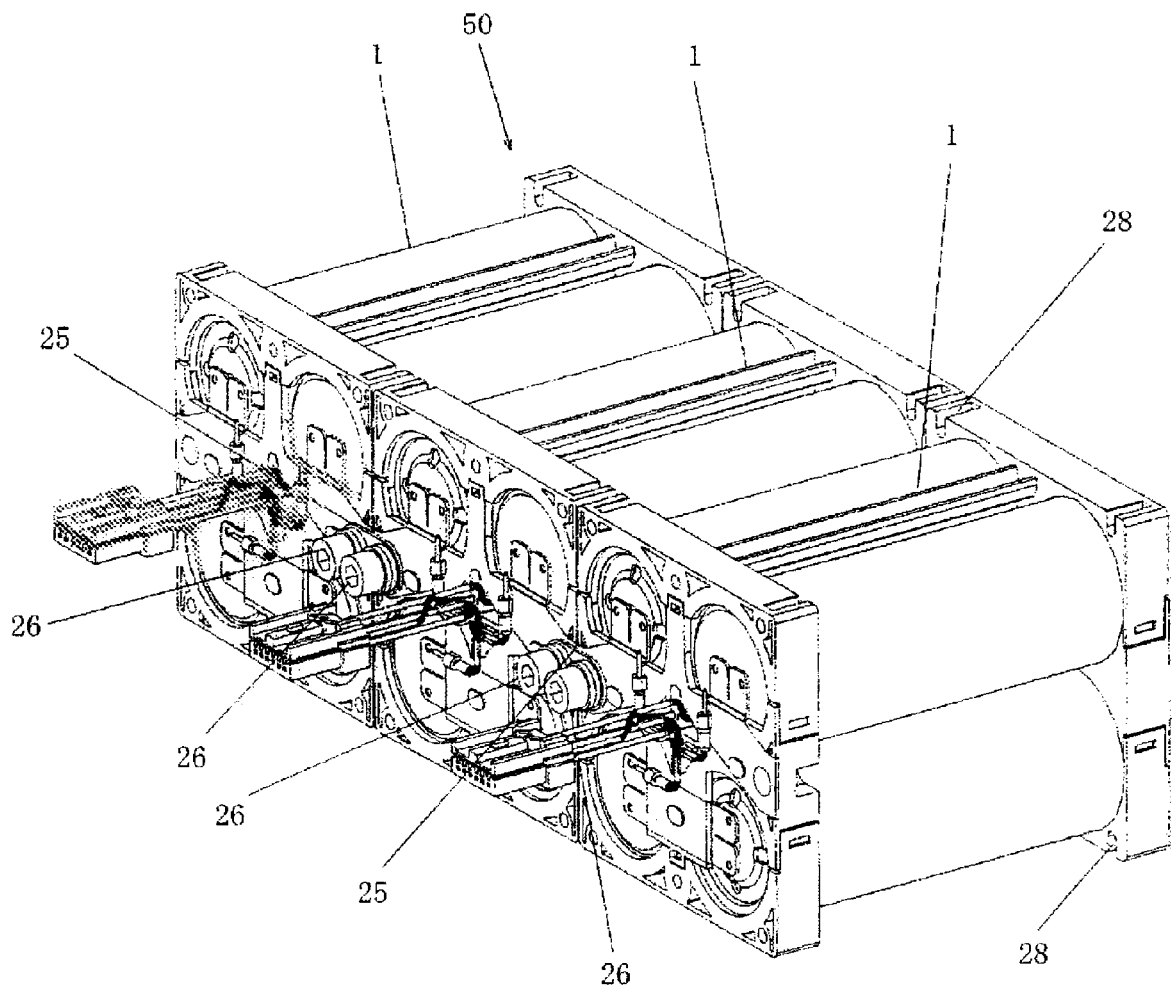
FIG. 1 is an appearance perspective view of a battery module of an embodiment to which the present invention is applicable.

As shown in FIG. 1, a battery module 50 according to the embodiment is equipped with three assembled batteries 1 which are connected in series.

Figure 2:
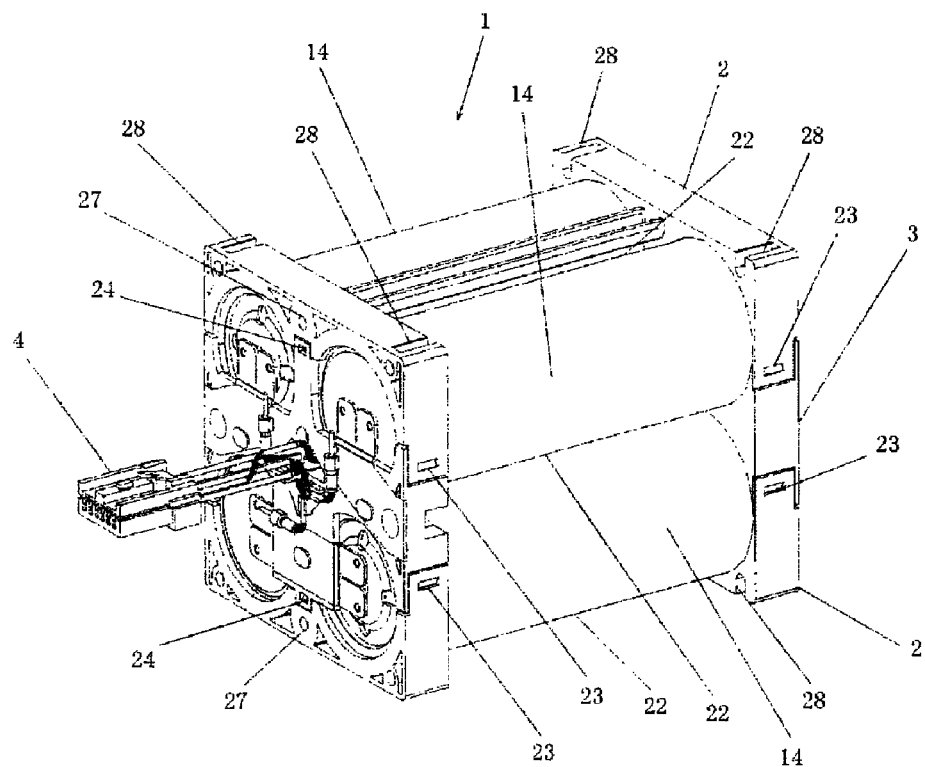
FIG. 2 is an appearance perspective view of an assembled battery constituting the battery module of the embodiment, seen from a front side of the assembled battery.
Figure 3:
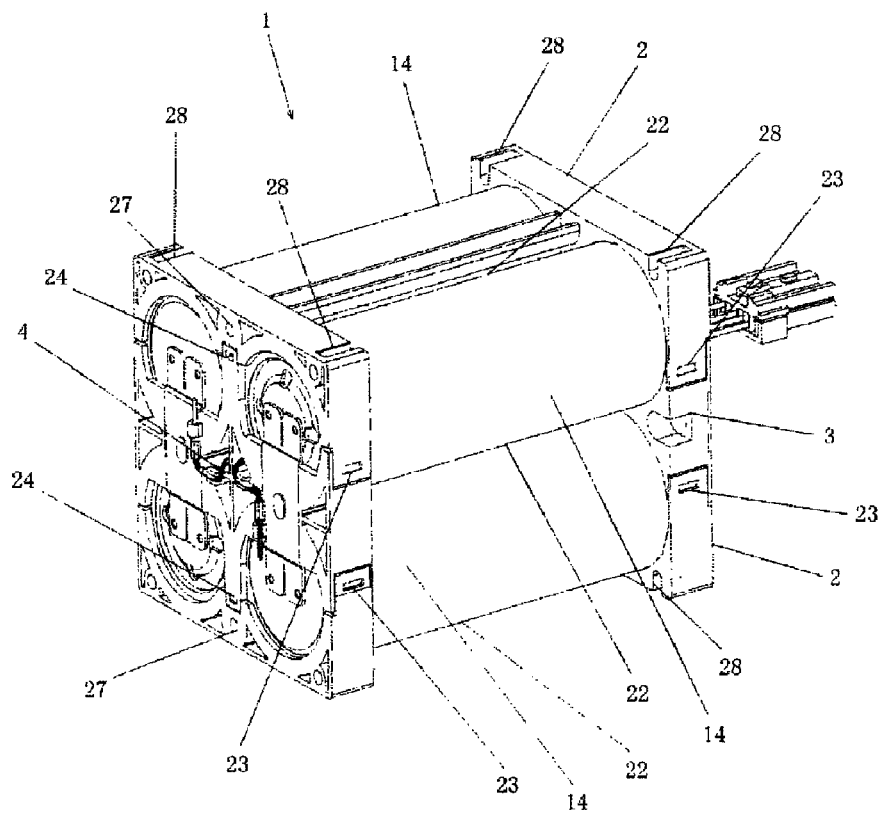
FIG. 3 is an appearance perspective view of the assembled battery constituting the battery module of the embodiment, seen from a back side of the assembled battery.
Figure 4:
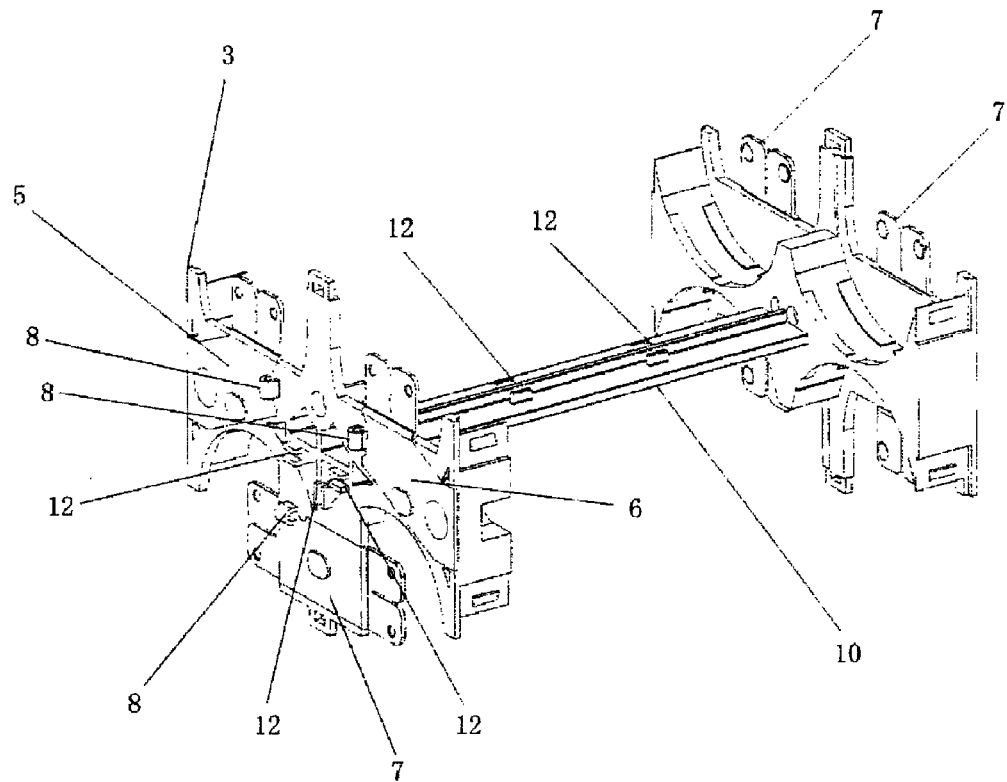
FIG. 4 is an appearance perspective view of an inner frame of the assembled battery.
Figure 5:
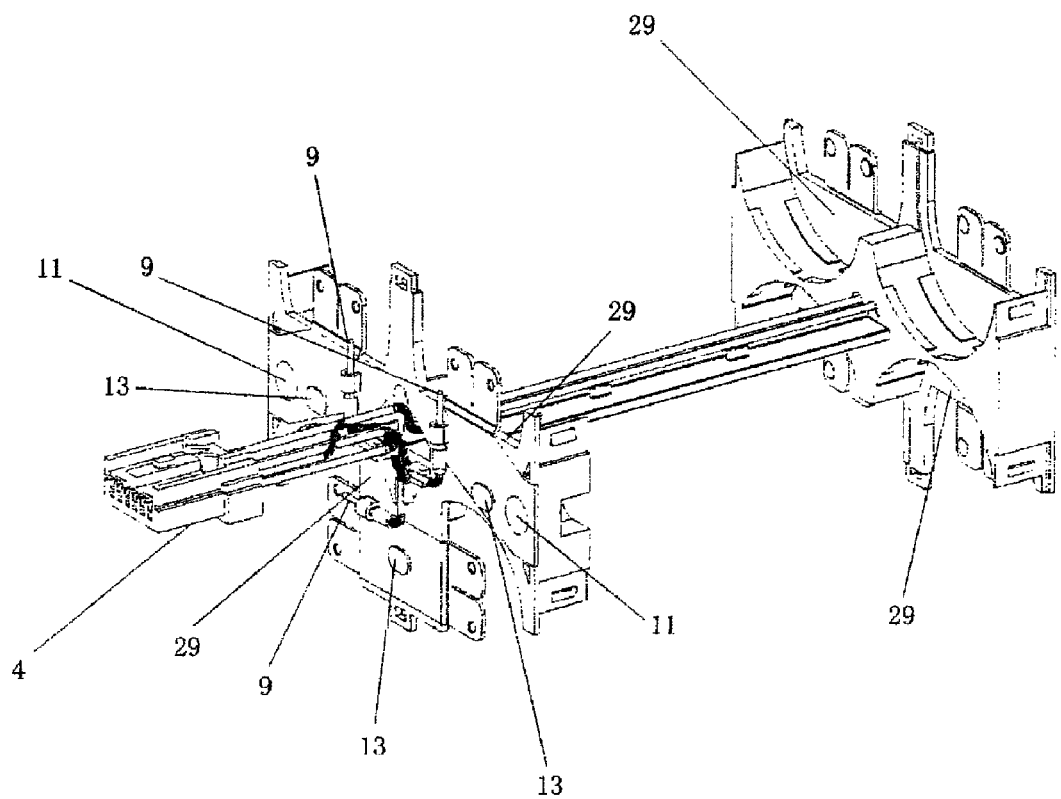
FIG. 5 is an appearance perspective view of the inner frame fixed with voltage detecting wires having a connector.

As shown in FIGS. 2 and 3, the assembled battery 1 has four cylindrical lithium-ion batteries 14 (hereinafter, called "unit cells 14"), a frame that retains the unit cells 14, connecting members (bus bars) that connect the unit cells 14, and lead wires for voltage detection for detecting voltages of the unit cells 14.

Figure 6:
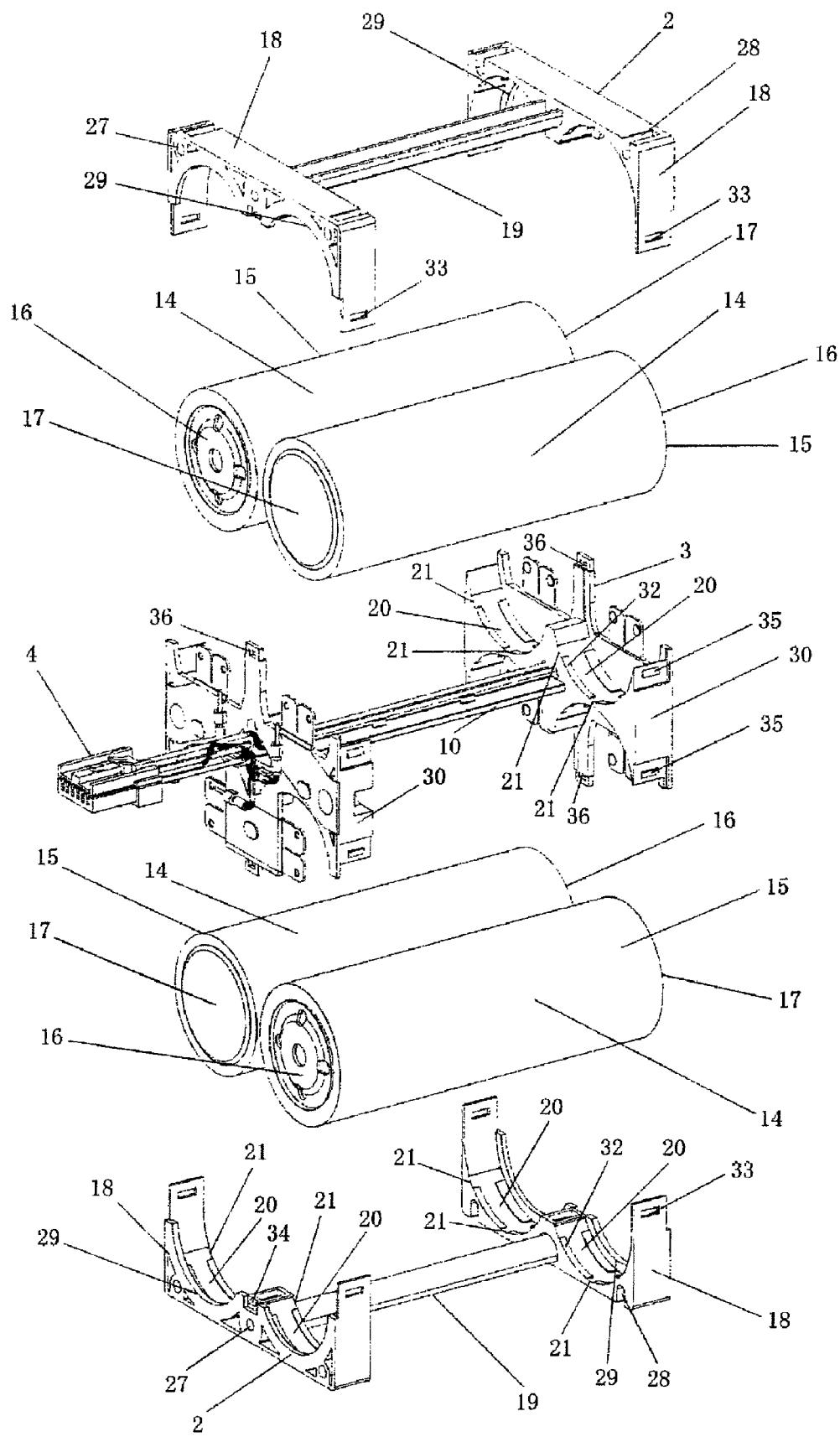
FIG. 6 is an exploded perspective view of the assembled battery, seen from the front side thereof.
Figure 7:
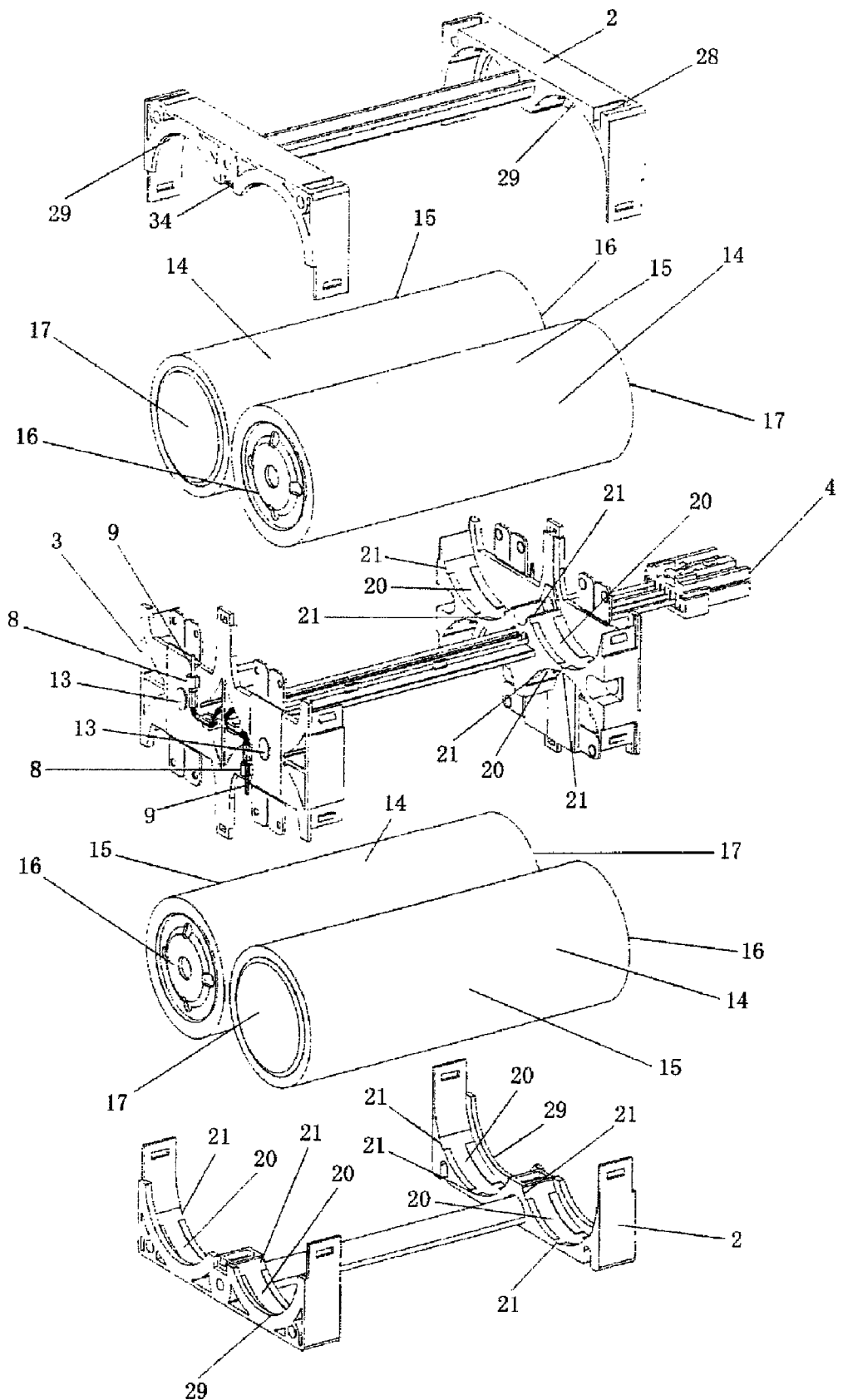
FIG. 7 is an exploded perspective view of the assembled battery, seen from the back side thereof.

Each unit cell 14 has a winding group obtained by winding a positive electrode and a negative electrode though a separator in a cylindrical metal container having a bottom, where the electrode group is infiltrated into non-aqueous electrolytic solution. As shown in FIGS. 6 and 7, an upper portion of the metal container 17 is sealed through a disk-like upper lid (positive electrode lid) 16 and a gasket in a crimping manner. The positive electrode constituting the winding group is connected to the upper lid 16, and the negative electrode is connected to the battery container 17. A side peripheral face of the unit cell 14 is coated with a thermally shrinkable tube 15. Therefore, an end face of the positive electrode lid 16 and a bottom end face of the metal container 17 that are exposed outside and are positioned at both ends of the unit cell 14 serve as external terminals.

The frame described above is made of electrically insulating resin material. The frame is composed of two outer frames 2 having the same shape and an inner frame 3. Some of the unit cells 14 are sandwiched between the inner frame 3 and one of the outer frames 2 and the remaining ones thereof are sandwiched between the inner frame 3 and the other of the outer frames 2 that is disposed to be vertically symmetrical to the one, and the unit cells 14 are arranged in a square orthogonal shape of two row and two column such that terminal directions (horizontal direction in FIGS. 6 and 7) of unit cells 14 adjacent to each other through the inner frame 3 are reversed to each other.

Each outer frame 2 has two outer frame retaining portions 18 that abut on the positive and negative electrode end portions of the unit cell 14 from the outside of the unit cell 14 to retain the unit cell 14, and an outer frame supporting portion 19 that defines a distance between the outer frame retaining portions 18 and is integrally formed with the outer frame retaining portions 18. The two outer frame retaining portions 18 are formed in the same shape, and they are fixed to be horizontally symmetrical to the outer frame supporting portion 19. The outer frame supporting portion 19 has an approximately U shape for achieving weight-reduction of the assembled battery 1 and obtaining a predetermined strength.

Arc-shaped abutting portions 32 are formed at two portions of the each outer frame retaining portion 18 which abut on the positive and negative electrode end portions of the unit cell 14. A groove portion in which bonding material such as adhesive is filled is formed in the abutting portion 32 for fixing the positive or negative electrode end portions of the unit cell 14 to the abutting portions 32. The groove portion has an arc-shaped groove portion 20 formed to extend along the arc shape of the abutting portion 32 and crossing groove portions 21 which are formed at a central portion and both end portions of the arc-shaped groove portion 20 and across in a direction perpendicular to the arc-shaped groove portion 20.

An arc-shaped positioning portion 29 for defining a face position (a distal end position of a unit cell) of a positive or negative electrode end of a unit cell 14 is integrally formed on a face (outside face) opposite to a face on which the outer frame supporting portion 19 is fixed on the outer frame retaining portion 18 so as to extend along the above-described abutting portion 32. The outer frame retaining portion 18 is formed with U-shaped positioning grooves 28 for fixing the assembled battery 1 or positioning the same at both corner portions of a face of the outer frame retaining portion 18 opposite to a face formed with the abutting portions 32. Further, the outer frame retaining portion 18 is formed with an assembled battery fixing portions 27, each comprising a female screw, for fixing an assembled battery 1 from the face thereof opposite to the face on which the outer frame supporting portion 19 is fixed.

Both end portions of the outer frame retaining portion 18 positioned perpendicularly to the outer frame supporting portion 19 are extended toward the inner frame 3. A first rectangular fitting hole 33 is formed at a distal end of each end portion of outer frame retaining portion 18 extending toward the inner frame 3. Since the outer frame 2 has two outer frame retaining portions 18, the outer frame 2 includes four first fitting holes 33. The outer frame retaining portion 18 is formed with a rectangular recess at an end portion of the center thereof connecting the above-described positioning portions 29 on a face of the outer frame retaining portion 18 opposite to the outer frame supporting portion 19, where a first protrusion 34 is disposed in the rectangular recess in a projecting manner. Incidentally, the center connecting the abutting portions 32 of the outer frame retaining portion 18 is subjected to boring in a rectangular shape for reducing weight.

As shown in FIGS. 4 to 7, the inner frame 3 has two inner frame retaining portion 30 that abuts on positive and negative electrode end portions of unit cells 14 from inner sides of the unit cells 14 to support the unit cells 14, and an inner frame supporting portion 10 that defines a distance between the inner frame retaining portions 30 and is formed integrally with the inner frame retaining portions 30. The two inner frame-retaining portions 30 have the same shape approximately, and they are fixed to the inner frame supporting portion 10 such that they face each other.

The inner frame-supporting portion 10 is formed in a strip shape for maintaining predetermined strength and achieving weight reduction, allowing extension of lead wires for voltage detection along the same, preventing the lead wires for voltage detection from being flip-flopped by cooling air flowing between unit cells in an assembled battery 1, and regulating the flow of cooling air. The inner frame supporting portion 10 is formed with a plurality of lead wire fixing portions 12, and the lead wires for voltage detection are fixed to the inner frame supporting portion 10 using a bundling band (not shown). A connector for gathering a plurality of lead wires for voltage detection is attached to one ends of the lead wires for voltage detection in advance, and the lead wires for voltage detection are collectively handled as a lead wire for voltage detection with a connector 4. The distance between the inner frame retaining portions 30 defined by the inner frame-supporting portion 10 and the distance between the outer frame retaining portions 18 defined by the outer frame supporting portion 19 are set to be equal to each other.

Arc-shaped abutting portions 32 are formed at portions (four) of the inner frame retaining portions 30 on which a positive or negative electrode end portion of a unit cell 14 abuts. The abutting portion 32 is formed with a groove portion filled with bonding agent or the like for fixing the positive or negative electrode end portion of the unit cell 14 to the abutting portion 32 like the abutting portion 32 of the outer frame 2 described above, where the groove portion includes an arc-shaped groove portion 20 formed along an arc shape of the abutting portion 32 and crossing groove portions 21 which are formed at a central portion and both end portions of the arc-shaped groove portion 20 and across in a direction perpendicular to the arc-shaped groove portion 20.

A positioning portion 29 that closes the abutting portion 32 formed on the inner frame retaining portion 30 on an face side (outer side) opposite to a face on which the inner frame supporting portion 10 is fixed to define a face position (a distal end position of a unit cell) of a positive or negative electrode end of a unit cell 14 is integrally formed on the inner frame retaining portion 30. However, arc-shaped positioning portions 29 are integrally formed at two portions of the inner frame retaining portion 30 positioned below the inner frame supporting portion 29 on a side where the lead wire for voltage detection with a connector 4 is derived like the outer frame retaining portion 18. Rectangular groove portions that can accommodate an end portion extending from the outer frame retaining portion 18 are formed at upper and lower portions of the inner frame retaining portion 30 on both end portions thereof perpendicular to the inner frame supporting portion 10 (a mutual connection structure is adopted). The rectangular groove portion is provided with a second protrusion 35 interfitted into the first fitting hole 33 described above in a projecting manner. The inner frame 3 has two inner frame retaining portions 30, and second protrusions 35 are provided at upper and lower portions of the inner frame retaining portion 30 on both end portions thereof perpendicular to the inner frame supporting portion 10, so that eight second protrusions 35 are provided on the inner frame 3 in a projecting manner.

The inner frame retaining portion 30 is integrally formed with upper and lower extending portions with the same thickness as that of the positioning portion 29 that extend toward the outer frame 2 at a central portion of the inner frame retaining portion 30 positioned between the positioning portions 29 closing the abutting portion 32 formed on the inner frame retaining portion 30 on the face side opposite to the face on which the inner frame supporting portion 10 is fixed. A mutual connection structure is adopted such that distal end portions of the upper and lower extending portions are each accommodated in the groove portion formed at the end portion of the center of the outer frame retaining portion 18 connecting the positioning portions 29 thereof, where each distal end portion is formed with a second rectangular fitting hole 36 fitted with the first protrusion 34.

The inner frame retaining portion 30 is fixed with a plurality of bus bars for connecting four unit cells 14 in series. That is, an approximately reverse L-shaped (obtuse angle) positive electrode terminal bus bar 5 extending upwardly of the positioning portion 29, an approximately L-shaped (obtuse angle) negative electrode terminal bus bar 6 extending upwardly of the positioning portion 29, and an inter-unit cell bus bar 7 extending from a lower portion of the upper and lower extending portion approximately horizontally toward both sides are fixed to the inner frame retaining portion 30 on the side of extension of the lead wire for voltage detection with a connector 4 (the inner frame retaining portion 30 on the left portion in FIG. 6) by projecting bus bar fixing portions 13. The positive electrode terminal bus bar 5 and the negative electrode terminal bus bar 6 have female screw portions 11 at portions thereof positioned outside the bus bar fixing portions 13, and the centers of the female screw portions 11 are positioned on an approximately horizontal line.

On the other hand, two inter-unit cell bus bar 7 extending on both sides of the positioning portion 29 approximately vertically are fixed by projecting bus bar fixing portions 13 on the inner frame retaining portion 30 (the inner frame retaining portion 30 on the right side in FIG. 6) positioned on a side opposite to the inner frame retaining portion 30 positioned on the side where the lead wire for voltage detection with a connector 4 is derived and on a face side opposite to a face on which the inner frame supporting portion 10 is fixed. Incidentally, portions of two inter-unit cell bus bars 7 extended upwardly of the positioning portion 29 (on the side of the terminal of the unit cell 14) are positioned so as to be opposed to portions of the positive electrode terminal bus bar 5 and the negative electrode terminal bus bar 6 extended upwardly of the positioning portion 29.

Portions of the positive electrode terminal bus bar 5, the negative electrode terminal bus bar 6, and the inter-unit cell bus bar 7 extended on the terminal side of the unit cell 14 are branched to two extension portions and each of the branched extension portions is formed with a circular hole applied for performing spot welding to a terminal of the unit cell 14.

The lead wire for voltage detection with a connector 4 has rod-shaped crimp-type terminals 9 at distal ends of the lead wires. The positive electrode terminal bus bar 5, the negative electrode terminal bus bar 6, and the inter-unit cell bus bar 7 have approximately cylindrical crimp-type terminal fitting portions 8 connected and fixed with the rod-shaped crimp-type terminals 9 (retaining the rod-shaped crimp-type terminals 9).

Lead wire fixing portions 12 for fixing a lead wire portion is erectly provided on the inner frame retaining portion 30 in order to prevent the lead wire portion of the lead wire for voltage detection with a connector 4 from being flip-flopped by external force such as vibrations. Incidentally, an approximately central portion of the inner frame retaining portion 30 on the face side opposite to the face on which the inner frame supporting portion 10 is fixed is subjected to boring in order to allow insertion of the lead wire portions of the lead wire for voltage detection with a connector 4 and achieve weight reduction of the assembled battery 1.

As shown in FIGS. 2 and 3, the assembled battery 1 is constituted by filling bonding material in the arc-shaped groove portions 20 and the crossing groove portions 21 and disposing and fixing four unit cells 14 in the frame such that the polarities of the unit cells 14 are alternate regarding the same side and the upper and lower sides. The first protrusions 34 are fitted into the second fitting holes 36 at the side face coupling portions 23 and the second protrusions 35 are fitted into the first fitting holes 33 at the vertical coupling portions 24 so that the frame composed of two outer frames 2 and the inner frame 3 is integrated. Incidentally, a direction in which the first protrusion 34 and the second fitting hole 36 are fitted to each other and a direction in which the second protrusion 35 is fitted into the fitting hole 33 are perpendicular to each other.

Further, the positive electrode terminal and the negative electrode terminal of the unit cell 14 exposed to the outside are joined (spot-welded) to the positive terminal bus bar 3, the negative electrode bus bar 6, and the inter-unit cell bus bar 7, respectively. The lead wire portions of the lead wire for voltage detection with a connector 4 are fixed to the lead wire fixing portions 12 and the rod-shaped crimp-type terminals 9 at the distal end of the lead wires are crimped to the crimp-type terminal fitting portions 8. Accordingly, the rod-shaped crimp-type terminal 9 and the crimp-type terminal fitting portion 8 are connected to each other through plastic deformation. Incidentally, the unit cells 14 constituting the assembled battery 1 are spaced from each other so that cooling air ventilation paths 22 are formed such that cooling air flows through a space defined by side faces of the assembled battery 1 to an upper face thereof, a space between the assembled batteries 1, and a space defined by a lower face of the assembled battery 1.

As shown in FIG. 1, the battery module 50 is composed of three assembled batteries 1 arranged laterally, where the negative electrode bus bar 6 and the positive electrode terminal bus bar 5 of the adjacent assembled batteries 1 are electrically connected to each other by an inter-assembled battery bus bar 25. The inter-assembled battery bus bar 25 is fastened to the negative electrode bus bar 6 and the positive electrode terminal bus bar 5 by cap bolts 26 screwed to a female screw portion 11 of the negative electrode terminal bus bar 6 and screwed to a female screw portion 11 of the positive electrode terminal bus bar 5 at both sides of the inter-assembled battery bus bar 25. Since the assembled battery 1 described above includes four unit cells 1 connected serially, a rated voltage of about 12V is obtained, and since the battery module 50 is provided with three assembled batteries 1, a rated voltage of about 36V can be obtained.

Each assembled battery 1 constituting the battery module 50 is fixed on a rail-like base plate (not shown). Since positioning groove portions 28 are formed in the outer frame retaining portion 18 of each assembled battery 1, positioning and fixing of each assembled battery 1 are achieved by forming protrusions fitted into the positioning groove portions 28 in the base plate.

The battery module 50 is accommodated in a casing (not shown), and the casing has a structure where cooling air can be introduced from the outside into the cooling air ventilation paths 22. Incidentally, the rail-like base plate (not shown) is fixed to the casing. Derivation paths extend from the positive electrode terminal bus bar 5 of the uppermost assembled battery 1 and the negative electrode terminal bus bar 6 of the lowermost assembled battery 1 to a positive electrode external output terminal and a negative electrode external output terminal of the battery module 50 via a cap bolt (not shown). A fuse or the like can be interposed in the derivation path according to the specification of the battery module 50. The connector of the lead wire for voltage detection with a connector 4 of each assembled battery 1 is connected to a connector (not shown) derived from a cell controller for monitoring a voltage of each unit cell 1 constituting the battery module 50.

(Assembling Procedure)

Next, an assembling procedure of the battery module 50 according to the embodiment will be explained mainly based upon an assembling procedure for the assembled battery 1. Incidentally, prior to assembling, the positive electrode terminal bus bar 5, the negative electrode terminal bus bar 6, the inter-unit cell bus bar 7, and the lead wire with voltage detection with a connector 4 are fixed to the inner frame 3 and the lead wire portions of the lead wire for voltage detection with a connector 4 are fixed to the inner frame retaining portions 30 and the lead wire fixing portions 12 of the inner frame supporting portion 10 and the inner frame retaining portion 30, and the rod-like crimp-type terminals 9 are fitted into the crimp-type terminal fitting portions 8, so that the inner frame 3 is parts-controlled as an assembly or a unit having the positive electrode terminal bus bar 5, the negative electrode terminal bus bar 6, the inter-unit cell bus bar 7, and the lead wire for voltage detection with a connector 4.

As shown in FIGS. 6 and 7, one outer frame 2 of two outer frames 2 are placed such that the abutting portions 32 face upwardly, bonding material is filled in the arc-shaped groove portions 20 and the crossing groove portions 21, and two unit cells 14 are placed on the abutting portions 32 (end faces thereof abut on the abutting portions 32) such that polarities thereof are alternately positioned regarding the positioning portions 29. Subsequently, bonding material is filled in the arc-shaped groove portions 20 and the crossing groove portions 21 on the lower side of the inner frame retaining portions 30, the abutting portions 32 of the inner frame retaining portions 30 are caused to abut on the positive and negative electrode ends of the unit cells 14 retained by the outer frame 2 based upon the positioning portions 29, so that one outer frame 2 (placed on the lower side) and the inner frame 3 are integrated to each other through the side face joining portions 23 and the vertical coupling portions 24.

Next, bonding material is filled in the arc-shaped groove portions 20 and the crossing groove portions 21 on the upper side of the inner frame retaining portions 30, two unit cells 14 are placed on the abutting portions 32 based upon the positioning portion 29 such that polarities thereof are alternately positioned regarding the polarities of two unit cells 14 that have been already placed on the outer frame 2. Of course, the positive electrode lid 16 of the unit cell 14 is positioned to the positive electrode terminal bus bar 5, while the negative electrode container 17 is positioned to the negative electrode terminal bus bar 6. Subsequently, bonding material is filled in the arc-shaped groove portions 20 and the crossing groove portions 21 of the outer frame retaining portions 18 of the other outer frame 2 of the two outer frames 2, and the abutting portions 32 of the outer frame retaining portions 18 are caused to abut on the positive and negative electrode ends of the unit cells 14 retained on the inner frame 3 such that the abutting portions 32 face downwardly based upon the positioning portions 29, so that the inner frame 3 and the other outer frame 2 are integrated to each other through the side face coupling portions 23 and the vertical coupling portion 24. Incidentally, even if much time is required for development of bonding force of bonding material, the inner frame 3 and the two outer frames 2 are maintained in a fixed state thereof by bonding forces at the side face coupling portions 23 and the vertical coupling portions 24.

Next, each of the positive electrode terminal bus bar 5, the negative electrode terminal bus bar 6, and the inter-unit cell bus bar 7, and the unit cell 14 are electrically connected to each other by spot welding performed at two portions, so that assembling of the assembled battery 1 is completed.

Three assembled batteries 1 assembled in the above manner are fixed in the casing by fitting and fixing the positioning grooves 28 to the protrusions formed on the rail-like base plates fixed on the casing and fixing the assembled battery fixing portions 27 in the casing using screws. Next, the assembled batteries 1 are connected to each other by the inter-assembled battery bus bar 25 and the cap bolts 26, and derivations to a positive electrode external output terminal and a negative electrode external output terminal of the battery module 50 via cap bolts (not shown). Subsequently, assembling of the battery module 50 is completed by connecting connectors derived from the cell controller to connectors of the lead wire for voltage detection with a connector 4 of the respective assembled batteries 1. Incidentally, the battery module 50 is imparted with a function serving as a battery module by initially charging respective unit cells 14 via a charger (not shown).

(Operation and the Like)

Next, an operation and the like of the battery module 50 according to the embodiment will be explained mainly base upon an operation and the like of the assembled battery 1.

In the assembled battery 1 constituting the battery module 50 of the embodiment, since four unit cells 14 can be retained and fixed using two outer frames 2 through the inner frame 3, an assembling work for an assembled battery is made easy. Since the unit cells are held and fixed using the frame composed of two outer frames 2 and an inner frame 3, it is made possible to form spaces for allowing flow of cooling air among the unit cells 14 at the assembling time. Since the abutting portions 32 of the frame are positioned at both ends of the unit cell 14, a major portion of the side face of the unit cell 14 is exposed, so that a contacting area of the unit cell 14 with cooling air can be expanded, which results in improvement of cooling performance.

Since the lead wire for voltage detection with a connector 4, the positive electrode terminal bus bar 5, the negative electrode terminal bus bar 6, and the inter-unit cell bus bar 7 are fixed to the inner frame 3 in advance, a working rate for assembling is considerably improved and a connecting work for respective sections is made easy. Since the lead wires for voltage detection for a connector 4 are connected to the positive electrode terminal bus bar 5, the negative electrode terminal bus bar 6, and the inter-unit cell bus bar 7 in advance, regarding not only easiness of working but also short-circuiting prevention during working, large merit can be obtained. Since electrically conductive members for connection can be collectively disposed about the inner fame 3, costs of parts constituting the whole frame can be reduced and size reduction of the assembled battery 1 can be achieved.

Since two outer frames 2 having the same shape are used, the number of kinds of parts constituting the assembled battery 1 can be reduced and parts-management is made easy. Since the positioning portion 29 and the abutting portion 32 on which an end face and an end portion side peripheral face of a unit cell 14 abut are formed on each of the outer frame retaining portion 18 and the inner frame retaining portion 30, arranging and positioning work for the unit cell 14 can be performed efficiently. Since the outer frame supporting portion 19 defining the distance between the outer frame retaining portions 18 and the inner frame supporting portion 10 defining the distance between the inner frame retaining portions 30 are provided, the outer dimension of the assembled battery 1 which has been assembled can be determined, so that variations in assembling work can be reduced. Further, since the lead wires for voltage detection 4 for a connector are fixed to the inner frame supporting portion 10, wearing, breaking, or the like of lead wires due to flip-flopping caused by vibrations or cooling air flowing can be prevented (reliability can be improved).

Since bonding material such as adhesive is filled in the arc-shaped groove portions 20 formed in the arc-shaped abutting portions 32 formed in the inner frame retaining portions 30 and the outer frame retaining portions 18 so that the unit cells 14 are held and fixed to the inner frame retaining portions 18 and the outer frame retaining portions 19, the assembled battery 1 resistive in vibration can be obtained and thermal stress can be relaxed owing to elastic force of bonding material. Even if a space occurs between the abutting portion 32 and the end portion side peripheral face of the unit cell 14 due to variations in manufacture, bonding material positioned in the arc-shaped groove portion 20 is filled in the space, so that high bonding force can be maintained. Since excessive bonding material filled in the arc-shaped groove portion 20 is moved to the crossing groove portions 21 formed in a direction perpendicular to the arc-shaped groove portion 20, fitting work during assembling is not blocked by the excessive bonding material, and a bonding face can be largely secured by the excessive bonding material moved.

Since the outer frames 2 are joined (fitted) to the inner frame 3 through the side face coupling faces 23 and the vertical coupling portions 24, it is unnecessary to use such a working jig as a holding jig, and even if much time is required for development of bonding force of bonding material, coupling of the frame composed of the outer frames 2 and the inner frame 3 is maintained by the fitting, so that an assembling and working cost can be reduced. Since coupling (fitting) directions of the side face coupling portions 23 and the vertical coupling portions 24 are perpendicular to each other, coupling (fitting) strength between the outer frames 2 and the inner frame 3 can be raised.

Since both end faces of a unit cell 14 are put in the same level as either one of end faces of a unit cell 14 that has been already held on the abutting portion 32 (are positioned on the same plane as the either one) by the positioning portions 29 formed on the outer frame retaining portions 18 and the inner frame retaining portion 30, variations in working such as welding can be suppressed to the minimum, and the positioning work can be further eliminated so that the assembling work can be made remarkably rapid.

In a disassembling work for the assembled battery 1, the unit cells 14 and the frame can be separated and disassembled from each other by only cutting the positive electrode terminal bus bars 5, the negative electrode terminal bus bars 6, and the inter-unit cell bus bars 7 positioned on a front face and a back face of the assembled battery 1 or breaking joined portions of the bus bars with the unit cells 14, cutting and peeling the thermally shrinking tubes 15 covering the unit cells 14, and cutting the outer frame supporting portion 10. The bus bars can be separated and disassembled from the inner frame 3 by breaking the bus bar fixing portions 13. Accordingly, the assembled battery 1 according to the embodiment is an assembled battery that is easy in fractionation disassembling, is easy in fractionation recovery, and is environmentally friendly.

In the battery module 50 according to the embodiment, electric connection of a plurality of the above-described assembled batteries 1 arranged can be achieved by only screw-fastening the inter-assembled unit bus bars 25 electrically connecting the assembled batteries 1 to female screw portions 11 formed on the positive electrode terminal bus bars 5 and the negative electrode terminal bus bars 6 fixed on the inner frame 3, so that power required can be obtained by only increasing or decreasing the number of assembled batteries 1, which can achieve high industrial value. Wire connection for the collected assembled batteries (the battery module 50) can be facilitated and short-circuiting due to erroneous wiring or the like can be prevented by using connectors of the lead wires for voltage detection with a connector 4.

Since the positioning groove portions 29 are formed in the outer frames 2 for the assembled battery 1, fixing is performed based upon the positioning groove portions 29, and vibration-proofing performance can be imparted to the assembled battery itself or the collected assembled batteries obtained by arranging a plurality of assembled batteries, performance suitable for a power source for a mobile machine such as a power source for an automobile can be developed. When any defect occurs in one unit cell 14 in the collected assembled batteries, only an assembled battery 1 to which the defective unit cell 14 belongs can be replaced by a new assembled battery 1, so that a degree of damage can be reduced from the whole collected assembled batteries to an individual assembled battery 1. Since positioning can be performed by fitting positioning groove portions 29 to the protrusions provided on the base plate for mounting the assembled batteries 1, so that working efficiency is remarkably improved.

In the embodiment, the example of the battery module 50 where three assembled batteries 1 are disposed so that the rated voltage is about 36V has been shown, but a voltage exceeding 36V can be achieved by only increasing the number of assembled batteries 1 so that higher voltage can be achieved easily. In the embodiment, the example where the assembled battery 1 is constituted by using four unit cells 14 has been shown, but the number of unit cells 14 constituting an assembled battery 1 can be increased or decreased by only increasing or decreasing the number of abutting portions 32 on the inner frame 3 and the outer frames 2.

In the embodiment, the cylindrical cells has been explained as the unit cell, but similar effect can be achieved even using a rectangular type cell when the abutting portion 32 is formed so as to conform with a side face portion of the rectangular type cell. The unit cell 14 can be utilized for not only a lithium-ion cell but also a rechargeable cell such as a nickel-hydrogen cell, and these cells can be used as a main power source or a mobile power source serving as a hybrid power source.

In the embodiment, the example of the lead wires for voltage detection with a connector 4 having the rod-like crimp-type terminals 9 at the distal ends of the lead wires has been shown, but cylindrical crimp-type terminals may be used instead of the rod-like crimp-type terminals 9. Joining utilizing resistive welding or joining utilizing low melting point metal such as solder may be adopted instead of crimping between the crimp-type terminal fitting portion 8 and the crimp-type terminal 9. In the embodiment, the example where the female screw portions 11 are formed in the positive electrode terminal bus bar 5 and the negative electrode terminal bus bar 6 has been shown, but similar effect can also be achieved by forming male screw portions. In the embodiment, the example that the positioning groove portion 28 is (integrally) formed in the outer frame 2 has been shown, but similar effect can also be achieved by forming a fixing hole or notching a groove portion in the outer frame retaining portion 18.

Industrial Applicability

Since the present invention can improve assembling easiness and can provide an assembled battery with reduced weight and high reliability at low cost, it contributes to manufacturing and marketing of assembled batteries, thereby providing industrial applicability.

What is claimed is:

1. An assembled battery provided with a frame for holding a plurality of unit cells, each unit cell having a positive electrode at one end thereof and having a negative electrode at the other end, wherein the frame has a first outer frame, an inner frame having a pair of opposing retaining portions holding four unit cells and a single supporting member connected at only a single central portion of each of the retaining portions, and a second outer frame, the plurality of unit cells are disposed on both sides of the inner frame, the first outer frame and the second outer frame are respectively disposed on one side and the other side of the inner frame to be joined to the inner frame such that the unit cells are sandwiched between the first outer frame and the inner frame and between the second outer frame and the inner frame, the electrodes of the unit cells being captured between the retaining portions of the inner frame, and each of the retaining portions of the inner frame being fixed to terminal bus bars and inter-unit cell bus bars for electrically connecting the electrodes of the unit cells and further being fixed to lead wires electrically connected to electrodes of each of the unit cells for individually detecting voltages of each of the respective unit cells.

2. An assembled battery according to claim 1, wherein the first outer frame and the second outer frame have the same shape.

3. An assembled battery according to claim 1, wherein each of the first and second outer frames and the inner frame has two retaining portions abutting on positive and negative electrode end portions of the unit cells and said supporting member defines a distance between the two retaining portions that is about the length of said unit cells.

4. An assembled battery according to claim 3, wherein the retaining portions of the first outer frame and the second outer frame are respectively formed with a first fitting hole and a first protrusion, and the retaining portions of the inner frame are each formed with a second protrusion fitted into the first fitting hole and a second fitting hole fitted with the first protrusion, and wherein the first outer frame and the second outer frame are joined to the inner frame by fitting the first and second protrusions into the second and first fitting holes, respectively.

5. An assembled battery according to claim 4, wherein a direction in which the first protrusion is fitted into the second fitting hole and a direction in which the second protrusion is fitted into the first fitting hole are orthogonal to each other.

6. An assembled battery according to claim 3, wherein the lead wires for voltage detection are disposed along the supporting member of the inner frame and are fixed thereto.

7. An assembled battery according to claim 3, wherein crimp-type terminals each having a distal end of a rod shape or a cylindrical shape are connected to the lead wires for voltage detection, and fitting portions holding the crimp-type terminals are formed on the terminal bus bars and the inter-unit cell bus bars, and wherein the lead wires for voltage detection and the terminal bus bars as well as the inter-unit cell bus bars are connected by plastically deforming the crimp-type terminals and the fitting portions.

8. An assembled battery according to claim 3, wherein the retaining portions have positioning portions for defining face positions of ends of the positive and negative electrodes of the unit cells.

9. An assembled battery according to claim 3, wherein the unit cells are cylindrical and the retaining portions have arc-shaped abutting portions abutting on end portion peripheral faces of the unit cells.

10. An assembled battery according to claim 9, wherein the abutting portions are formed with a groove portion for being filled with bonding material.

11. An assembled battery according to claim 10, wherein the groove portion formed at the abutting portions has a first groove portion formed to extend along the arc shape of the abutting portions and a second groove portion formed to extend in a direction perpendicular to the first groove portion.

12. An assembled battery according to claim 3, wherein a side face of each of the unit cells except for the one end and the other end thereof is coated with an insulating coating material, and the retaining portions of the inner frame have abutting portions abutting on end portion peripheral faces of the unit cells.

13. An assembled battery according to claim 3, wherein each of the terminal bus bars fixed to the inner frame has a male screw portion or a female screw portion.

14. An assembled battery according to claim 3, wherein each of the first outer frame and the second outer frame is formed with a hole or a notched groove portion for positioning or fixing.

15. An assembled battery according to claim 3, each of the lead wires for voltage detection is fixed with a connector at one side thereof.

16. An assembled battery provided with a frame for holding a plurality of unit cells, each unit cell having a positive electrode at one end thereof and having a negative electrode at the other end, wherein the frame has a first outer frame, an inner frame, and a second outer frame having the same shape as that of the first outer frame, the first and second outer frames and the inner frame each have two retaining portions holding four unit cells abutting on end portions of the positive and negative electrodes of the unit cells and a supporting member defining a distance between the retaining portions, the inner frame having a single supporting member connected at only a single central portion of each of its retaining portions such that opposite ends of each of the retaining portions extending away from the supporting member receive and retain the electrodes of the unit cells, the first outer frame and the second outer frame being respectively disposed on one side and the other side of the inner frame and are joined to the inner frame such that the unit cells are sandwiched between the first outer frame and the inner frame and between the second outer frame and the inner frame, wherein the retaining portions of the inner frame are fixed to terminal bus bars and inter-unit cell bus bars for electrically connecting the electrodes of the unit cells and the supporting member of the inner frame is fixed to lead wires electrically connected to each of the electrodes of the unit cells for individually detecting voltages of each of the respective unit cells.

17. An assembled battery according to claim 16, wherein the retaining portions of the first outer frame and the second outer frame are respectively formed with a first fitting hole and a first protrusion, and the retaining portions of the inner frame are each formed with a second protrusion fitted into the first fitting hole and a second fitting hole fitted with the first protrusion, and wherein the first outer frame and the second outer frame are joined to the inner frame by fitting the first and second protrusions into the second and first fitting holes, respectively.

18. An assembled battery according to claim 1, wherein said unit cells are single cells.

\* \* \* \* \*